United States Patent [19]

Burnett et al.

[11] Patent Number: 4,528,437
[45] Date of Patent: Jul. 9, 1985

[54] ELECTRICAL BRAZING ANTI-ARCING CONTROL CIRCUIT

[75] Inventors: Jesse W. Burnett; Homer H. Hall, both of Rome, Ga.

[73] Assignee: General Electric Company, King of Prussia, Pa.

[21] Appl. No.: 508,685

[22] Filed: Jun. 28, 1983

[51] Int. Cl.³ .............................................. B23K 11/24
[52] U.S. Cl. ............................ 219/85 CA; 219/85 G; 219/86.41; 361/2; 361/91
[58] Field of Search .......... 219/85 R, 85 CA, 85 CM, 219/85 G, 86.21, 86.41, 91.1; 361/2, 91, 88

[56] References Cited

U.S. PATENT DOCUMENTS

| | | | |
|---|---|---|---|
| 1,248,812 | 12/1917 | Costello | 219/85 CA |
| 1,280,818 | 10/1918 | Nikonow . | |
| 1,959,690 | 5/1934 | Roth . | |
| 2,183,908 | 12/1939 | Gladitz | 219/85 CA |
| 2,267,297 | 12/1941 | Campbell . | |
| 2,304,975 | 12/1942 | Warrender . | |
| 2,402,004 | 6/1946 | Adams . | |
| 2,542,629 | 2/1951 | Clawson . | |
| 2,656,446 | 10/1953 | Albarranc | 219/86.21 |
| 3,538,293 | 11/1970 | Procacino . | |
| 3,758,744 | 9/1973 | Spisak . | |
| 4,343,010 | 8/1982 | Denny et al. | 361/91.1 |

*Primary Examiner*—Clifford C. Shaw
*Attorney, Agent, or Firm*—Robert A. Cahill; William Freedman

[57] ABSTRACT

To prevent arcing during an electrical brazing operation, the voltage drop across the brazing electrodes is sensed. When this voltage drop exceeds a predetermined threshold level due to arcing, a relay in a control circuit is picked up and its normally closed contacts open to interrupt the energization circuit for a brazing current contactor relay. The control circuit also is equipped to inhibit brazing if a discontinuity exists in its electrical connection across the electrodes. Also disclosed is a pistol grip electrical brazing tool having its electrode supporting and manipulating elements shunted from the brazing current carrying paths.

9 Claims, 8 Drawing Figures

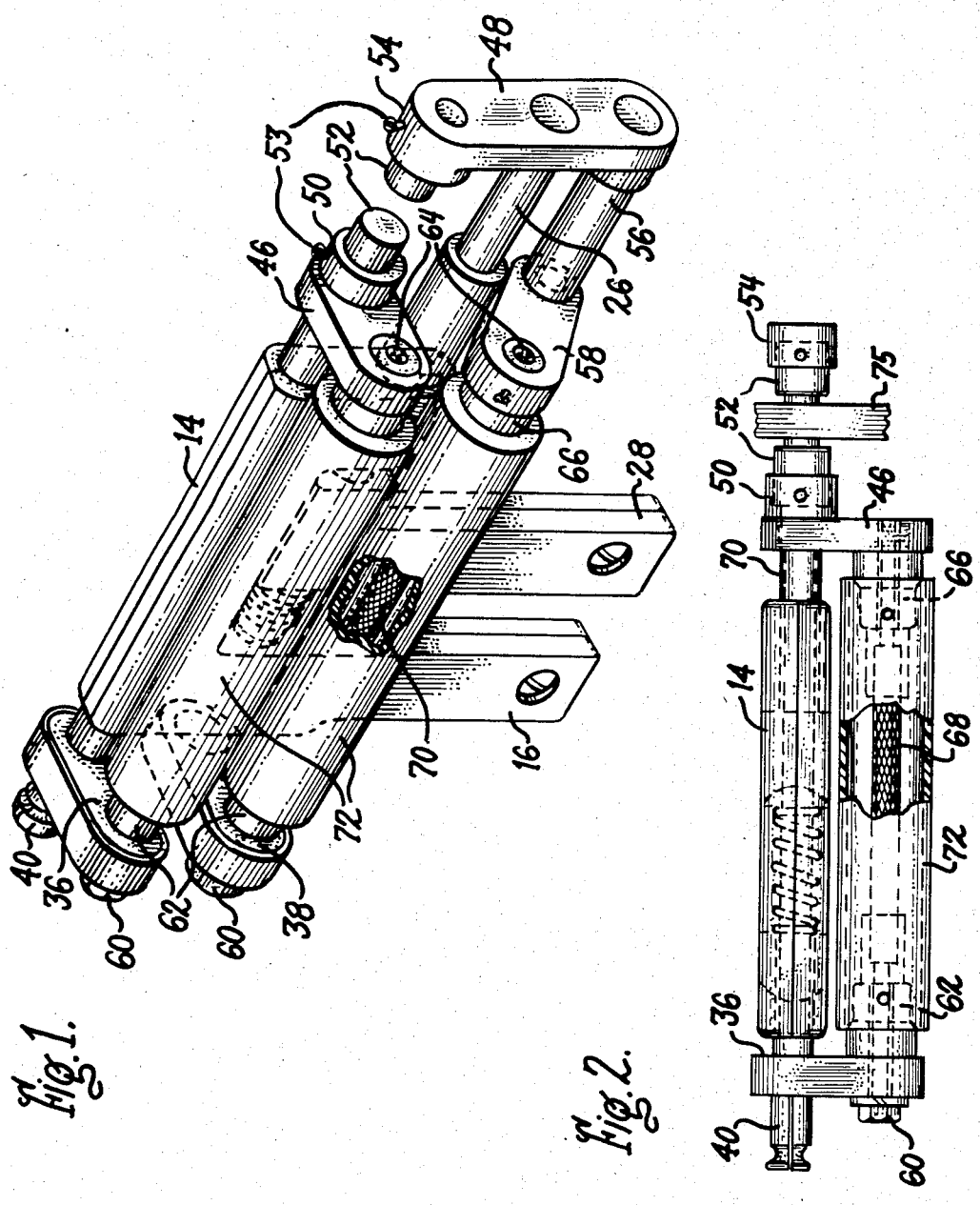

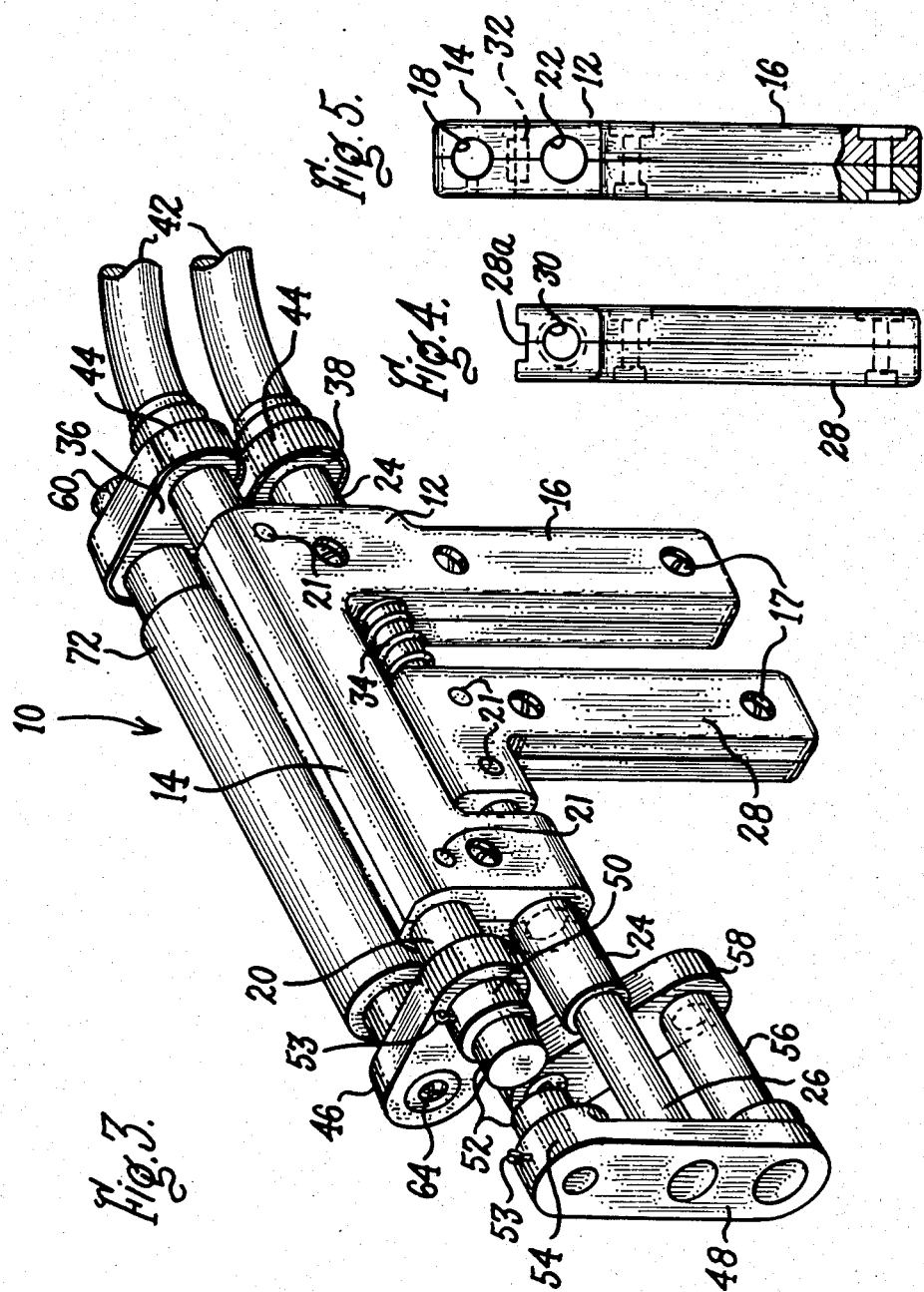

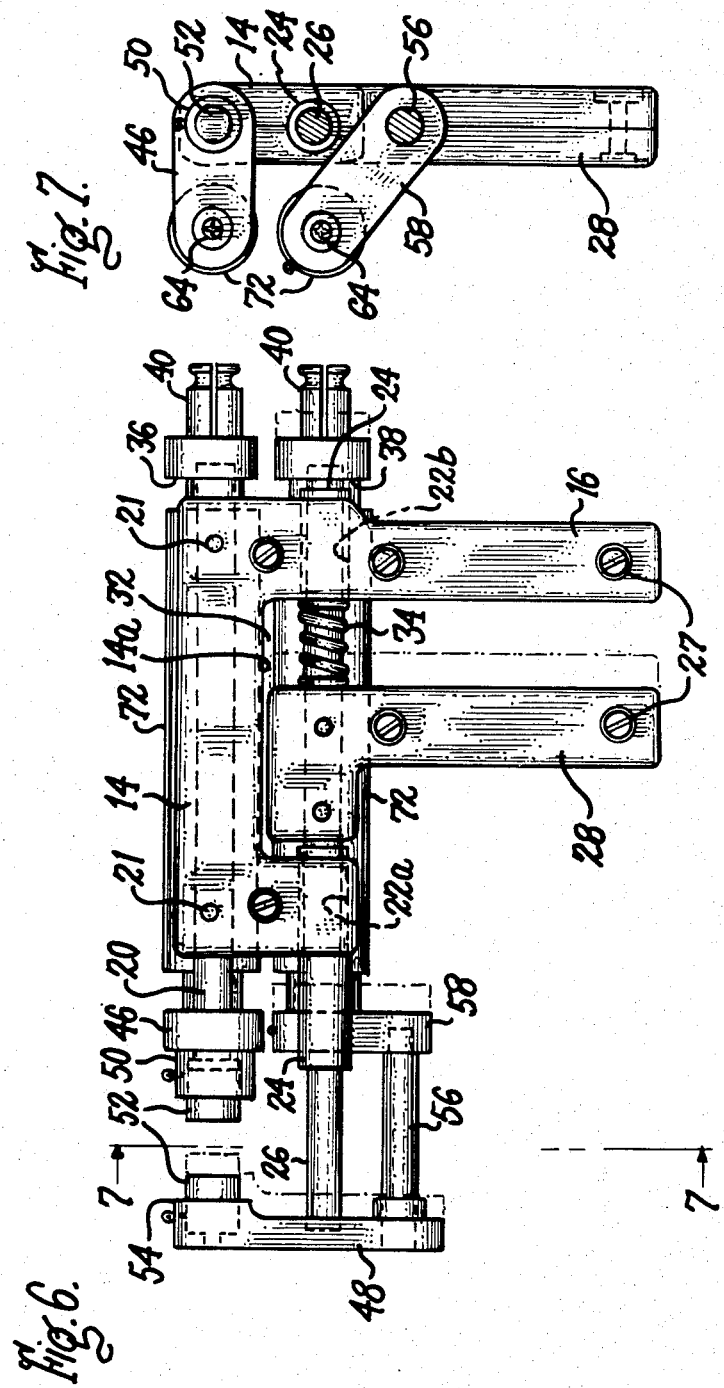

ELECTRICAL BRAZING ANTI-ARCING CONTROL CIRCUIT

REFERENCE TO RELATED APPLICATION

This application discloses an electrical brazing tool which is the subject of a commonly assigned application entitled PISTOL GRIP ELECTRICAL BRAZING TOOL (5D5872), filed concurrently herewith and now issued as U.S. Pat. No. 4,493,986.

BACKGROUND AND OBJECTS OF THE INVENTION

The present invention relates to electrical brazing, and particularly to a control circuit for preventing arcing at the brazing electrodes.

In performing a brazing operation, should the brazing electrodes fail to make good electrical contact with the metallic parts to be joined, arcing will invariably result. Such arcing needlessly erodes away the brazing electrodes, requiring their frequent replacement. The other main drawback to arcing is that the metallic parts are eroded as well. Normally, this is not a significant concern. However, in numerous applications the arc induced spattering of particles from the brazed parts can cause a deleterious fouling of the surrounding environment. This is particularly true in the manufacture or repair of electrical equipment, particularly when current carrying parts are spliced together by brazing. The spattered metallic particles can and do become lodged in the equipment and represent an often serious degradation of the equipment's dielectric integrity. In high voltage electrical equipment, these spattered metallic particles are particularly hazardous and have been known to precipitate ultimate equipment failure.

It is, accordingly, an object of the present invention to provide a control circuit operating to interrupt the flow of brazing current automatically upon the detection of arcing at the brazing electrodes.

A further object is to provide an anti-arcing control circuit of the above-character which can be readily adapted to both stationary brazing equipment and hand held brazing tools.

An additional object is to provide an anti-arcing control circuit of the above-character which is fail-safe in operation.

Another object is to provide an anti-arcing control circuit which is efficient in design, reliable in operation and convenient to use.

Other objects of the invention will, in part, be obvious and, in part, appear hereinafter.

SUMMARY OF THE INVENTION

In accordance with the present invention, there is provided a control circuit which is adapted to automatically effect the interruption in the flow of current to a pair of brazing electrodes in response to the detection of arcing thereat. Basically, the control circuit includes means for sensing the voltage appearing across the brazing electrodes during a brazing operation. Should arcing ensue, the resulting arc voltage produces a significant increase in the interelectrode voltage drop which is readily detectable by the sensing means. The sensing means responds by interrupting the energization circuit for a conventional contactor relay coil, and the contactor drops out to interrupt the flow of brazing current to the electrodes. The voltage sensing means is preferably in the form of a latching or bistable device, such as a latching relay, which sustains itself in an actuated state to inhibit resumption of a brazing operation until a manually initiated reset action is effected. This serves to discipline the operator in maintaining good electrical contacting engagement with the workpiece being brazed.

To insure fail-safe circuit operation, additional voltage sensing means is provided to sense the presence of a discontinuity in the electrical wiring connecting the circuit across the brazing electrodes. If there is a break in this wiring, the additional sensing means locks up the control circuit in a braze inhibit condition and provides for a signal manifesting that the control circuit is incapable of serving its anti-arcing purpose. The control circuit also includes interlocking features serving to insure safe and reliable circuit operation.

The invention accordingly comprises the features of construction, combination of elements, and arrangement of parts which will be exemplified in the construction hereinafter set forth, and the scope of the invention will be indicated in the claims.

DESCRIPTION OF THE DRAWINGS

For a fuller understanding of the nature and objects of the invention, reference should be had to the following detailed description taken in connection with the accompanying drawings, in which:

FIG. 1 is a perspective view of an electrical brazing tool constructed in accordance with the present invention;

FIG. 2 is a top view of the brazing tool of FIG. 1;

FIG. 3 is a different perspective view of the brazing tool of FIG. 1;

FIG. 4 is an end view of the trigger utilized in the brazing tool of FIG. 1;

FIG. 5 is an end view of the pistol grip frame utilized in the brazing tool of FIG. 1;

FIG. 6 is a side elevational view of the brazing tool of FIG. 1;

FIG. 7 is a sectional view taken along line 7—7 of FIG. 6; and

Corresponding reference numerals refer to like parts throughout the several views of the drawings.

DETAILED DESCRIPTION

Figure 8:
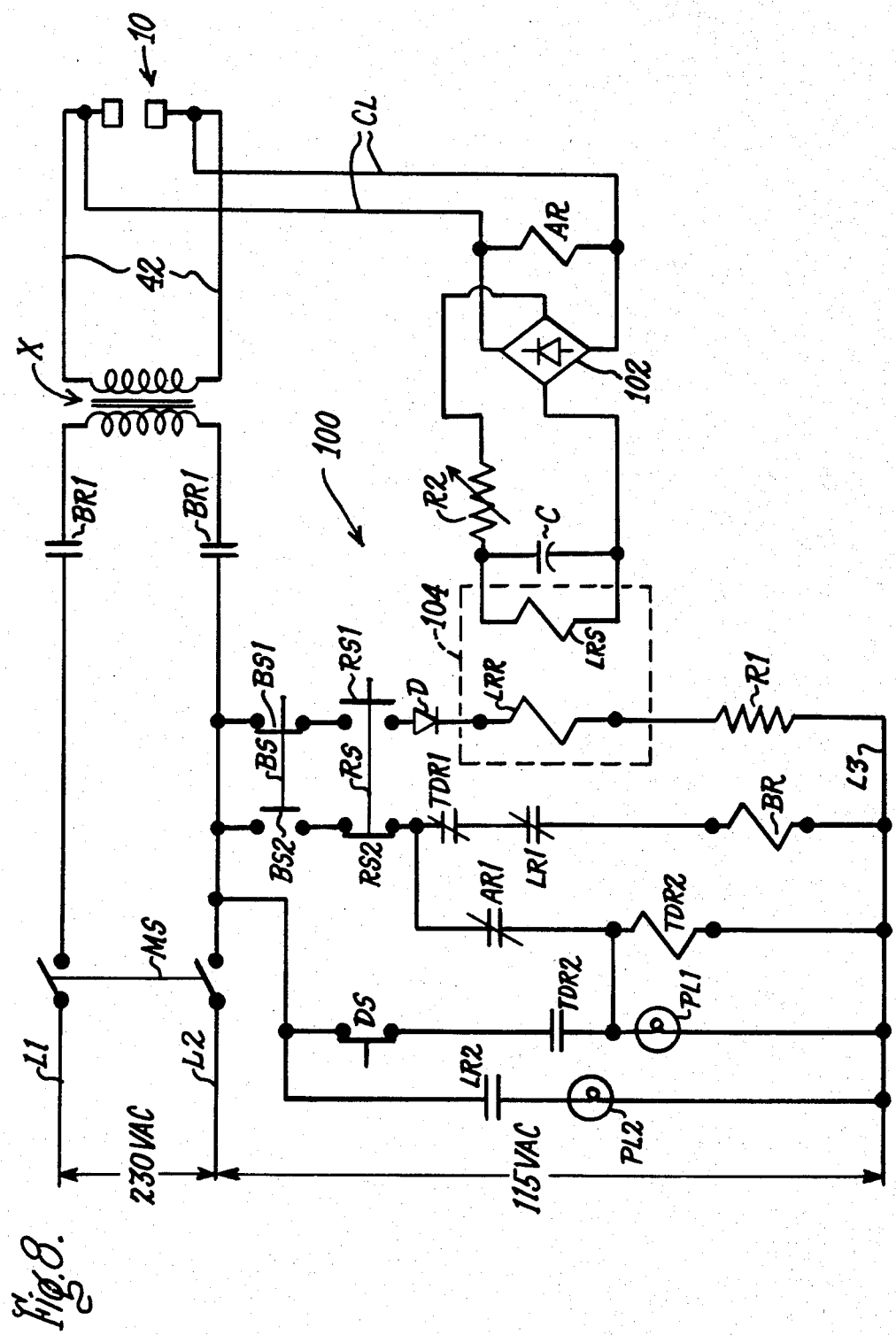
FIG. 8 is a circuit schematic diagram of an anti-arcing control circuit applicable to brazing tool such as that depicted in FIGS. 1 through 7.

Referring to the drawings, a brazing tool, generally indicated at 10 in FIG. 3, includes a generally L-shaped frame 12 having a longitudinally extending barrel 14 and a depending handle 16. The frame is formed from a structurally rigid insulative material, such as glass-filled polyester, in right and left halves, as best seen in FIG. 5, and held together by threaded fasteners 17 (FIG. 3). Barrel 14 is formed having a longitudinal upper passageway or bore 18 (FIG. 5) in which is accommodated an elongated support element in the form of a stainless steel tube 20, as best seen in FIG. 3. The support element is fixedly secured in bore 18 by transverse pins 21 (FIG. 3). Beneath bore 18, barrel 14 is formed having a second longitudinal passageway or bore 22, again as best seen in FIG. 5. From FIG. 6, it is seen that the barrel is relieved at 14a, and thus bore 22 is actually two longitudinally aligned but separated bores 22a and 22b. Secured in each of these bores is a tubular bushing 24 (FIGS. 3 and 6) which provide smooth sliding fits with a second elongated support element in the form of a stainless steel tube 26.

An elongated trigger 28 is formed from the same material as frame 12 in two halves and secured together by threaded fasteners 17, as seen in FIGS. 3 and 4. The upper, longitudinally extended portion of trigger 28 is formed having a longitudinal passageway or bore 30 which accepts the exposed portion of support element 26 extending between bores 22a and 22b in barrel 14. Pins 21 secure the trigger to this support element. To fix the angular position of this trigger-support element assembly, an elongated metal key 32 (FIGS. 5 and 6) is captured between the frame halves with its lower longitudinally extending portion exposed in frame relief 14a to serve as a rail which is engaged in a longitudinally extending notch 28a (FIG. 4) formed in trigger 28. Trigger 28 is thus depended from support element 26 in parallel relation with handle 16. A compression spring 34 carried on support element 26 biases the trigger to a forward position seen in FIGS. 3 and 6 in spaced relation to the handle. When the trigger is squeezed, bringing it rearwardly toward the handle, support element 26 slides through bushings 24 to a retracted, rearward position.

Affixed to the rearward end of upper support element 20, such as by brazing, is a laterally extending current carrying link 36 (FIGS. 1 and 3) formed of a suitable conductor material such as brass. A similar link 38 is affixed to the rearward end of support element 26. Affixed to each of these links are separate, rearwardly extending male connectors 40 (FIG. 6) which connect with the female electrical connector terminations of a pair of trailing cables 42 seen in FIG. 3. The edges of links 36 and 38 are covered by a pair of conforming shields 44 (FIGS. 1 and 3) of insulative material to effectively isolate the operator's hand from these current carrying parts. Another similar conductive link 46 is brazed to the forward end of upper support element 20, while a more elongated conductive link 48 is brazed at a location intermediate its ends to the forward end of lower support element 26. An electrode holder 50 is affixed in electrical connection to the frontal side of link 46 in substantial longitudinal alignment with its support element 20 and accepts a carbon electrode 52 removably held in place by a cotter pin 53. The upper end of link 48 is formed to provide an electrode holder 54 for accepting a second carbon electrode 52, also removable retained by a cotter pin 53. As seen in FIGS. 1–3, these electrodes are in longitudinally opposed spaced relation. The lower end of link 48 is affixed in electrical connection to one end of a short conductive rod 56, whose other end is affixed in electrical connection with the lower end of yet another conductor link 58, as seen in FIGS. 1 and 3. This last link extends obliquely upward in underlying relation with the lateral extension of link 46 (FIG. 7).

As best seen in FIGS. 1 and 2, affixed to the laterally extended free ends of links 36 and 38, by suitable means such as bolts 60, are separate cable connectors 62. Similarly, bolts 64 affix separate cable connectors 66 to the laterally extended free ends of links 46 and 58. Electrically connected between the longitudinally aligned upper set of connectors 62, 66 is a length of heavy current carrying, braided welding cable 68 (FIG. 2), while a similar length of welding cable 70 (FIG. 1) is electrically connected between the lower set of longitudinally aligned connectors 62, 66. These welding cable lengths are separately shielded by elongated, tubular insulators 72.

From the description thus far, it can be seen that half of the brazing current path through the tool is from one of the trailing cables 42 into link 36, through cable length 68 and, thence, through link 46 to the carbon electrode 50 mounted thereby. The other half of the brazing current path is from the other trailing cable into link 38, through cable length 70, link 58, rod 56 and link 48 to the other carbon electrode. Note that these brazing current paths shunt or bypass the support elements 20 and 26, and thus are not subjected to appreciable resistance heating, which would tend to degrade their structural rigidity and also heat up handle 16 and trigger 28 during protracted tool usage. To perform a brazing operation, the tool is grasped in one hand and manipulated to position carbon electrodes 52 in opposed relation with a workpiece 75 (FIG. 2) to be brazed. Trigger 28 is squeezed to retract support element 26, as seen in phantom in FIG. 6 and thus bring the electrodes into opposed, engaging relation with the workpiece. A brazing switch is then engaged to commence the flow of brazing current through the above-described current path halves which are completed by the workpiece itself. Upon completion of the brazing operation, the brazing switch is opened, and trigger is released. Spring 34 returns the retracted tool parts to their solid lines positions seen in FIG. 6. It will be appreciated that the angled, offset mounting of link 58 affords a widely unobstructed working space at the front end of tool 10 for more convenient access to the workpiece. It will be understood that support element 20 could be made retractable and support element 26 fixed to frame 12, and the operation of tool 10 would remain essentially the same. While the foregoing disclosure is cast in terms of a brazing tool, it will be appreciated that tool 10 could be utilized as a welding tool.

Turning to FIG. 8, there is shown the power circuit for providing brazing current to tool 10 and also an anti-arcing control circuit, generally indicated at 100, operating to interrupt the flow of brazing current in the event of arcing between the brazing electrodes and the workpiece. In some brazing applications, arcing should be avoided in order to prevent, not only undue erosion of the brazing electrodes, but more importantly the consequent spattering of metallic particles from the workpiece into the surrounding environment. For example, if the brazing tools are used to splice together coils of a transformer winding, these spattered conductor particles can foul the transformer's insulation system.

To this end, as seen in FIG. 8, an AC electrical power source, operating at a suitable voltage, e.g., 230 volts, is connected via lines L1 and L2 to drive the primary of a brazing transformer X with the closure of a double pole main switch MS and a pair of brazing contactor relay contacts BR1. The secondary of the transformer is connected by the brazing trailing cable 42, also seen in FIG. 3, to the tool 10 in supplying requisite low voltage, heavy brazing current to the tool electrodes. Running with the trailing cable are a pair of control leads CL which extend from electrical connections across the brazing electrodes back to the anti-arcing control circuit 100 where they are connected across the inputs of a full wave diode rectifying network 102 and the operating coil AR of an alarm relay. As will be pointed out, this alarm relay functions to detect any discontinuity in control leads CL which would totally defeat the anti-arcing purpose of control circuit 100. The full wave rectified DC output of network 102 is connected in series circuit with a variable resistor R2 and the set operating coil LRS of a DC bistable or latching relay, generally indicated at 104. Connected directly across this relay operating coil is a capacitor C. The parameters of resistor R2 and capacitor C are selected such that latching relay 104 responds to the existence of an arc voltage between the brazing electrodes.

The other or reset operating coil LRR of latching relay 104 is connected in series with the normally closed contacts BS1 of a manually operated braze switch BS, the normally open contacts RS1 of a manually operated reset switch RS, a diode D and a voltage dropping resistor R1 between line L2 of the brazing power circuit and a line L3. Lines L2 and L3 are connected with a suitable control circuit AC power source operating at, for example, 115 volts. Also connected across lines L2 and L3 is a series circuit including a normally open set of braze switch contacts BS2, a normally closed set of reset switch contacts RS2, normally closed contacts TDR1 of a time delay relay, normally closed contacts LR1 of latch relay 104 and operating coil BR of the braze contactor relay whose contacts BR1 operate in the brazing power circuit, as noted above. The operating coil TDR for the time delay relay is connected in series with normally closed contacts AR1 of the alarm relay between line L3 and the junction between reset switch contacts RS2 and time delay relay contacts TDR1. A second set of normally open time delay relay contacts TDR2 is connected in series with a manually operated, normally closed dropout switch DS and a pilot light PL1 between lines L2 and L3, with the junction between the pilot light and relay contacts TDR2 directly connected to the time delay relay operating coil TDR. Finally, a second pilot light PL2 and a second set of normally open latch relay contacts LR2 are connected in series between lines L2 and L3.

To place the circuitry of FIG. 8 in a standby condition, main switch MS is closed. When a brazing operation is to be performed, brazing switch BS, which ideally is implemented as a foot switch, is actuated to hold its contact set BS2 closed. Activating current is drawn through contactor relay coil BR and its contacts BR1 close to energize the primary of brazing transformer X. If there is no break in control leads CL, alarm relay coil AR will be activated under open circuit voltage and normal brazing voltage conditions existing across the brazing electrodes. Alarm relay contacts AR1 immediately separate to open the energization circuit for operating coil TDR of the time delay relay. The brazing operation may then be carried through to completion as braze switch contacts BS2 are held closed. If, however, there is a break in the control leads CL, alarm relay AR will not pick up upon closure of braze switch contacts BS2, and the time delay relay operating coil TDR will thus be activated through normally closed contacts AR1. After a short delay, the time delay relay picks up, and its contacts TDR1 open to interrupt the energizing circuit for contactor relay coil BR. The contactor relay drops out even though braze switch contacts BS2 are held closed, and relay contacts BR1 separate to de-energize the primary of brazing transformer X. The brazing operation is thus interrupted. In addition, relay contacts TDR2 close to provide a self-holding energization circuit for the time delay relay coil TDR through normally closed dropout switch DS. Thus, the time delay relay remains picked up even with the release of braze switch BS. Coincidentally, pilot light PL1 is energized to provide a sustained visual signal that there is a discontinuity in control leads CL, and thus the anti-arcing control circuit is not operational. Pending repair of the control lead break, dropout switch DS may be opened to interrupt the holding circuit for coil TDR, and the time delay relay is dropped out. The reason for the utilization of a time delay relay is to avoid a race situation with the alarm relay, and thus insure that relay contacts AR1 have the opportunity to separate before relay contacts TDR1 attempt to separate.

If, during a brazing operation, poor electrical contact between the electrodes and the workpiece occurs, with consequent arcing, the increased voltage drop across the electrodes raises the voltage on capacitor C to a magnitude sufficient to drive current of activating level proportions through relay coil LRS. Latching relay 104 picks up, causing its contacts LR1 to open and interrupt the energization circuit for contactor relay operating coil BR despite sustained closure of braze switch contacts BS2. Relay contacts BR1 separate to interrupt the supply of brazing current to tool 10. Coincidentally, latching relay contacts LR2 close to energize pilot light PL2, visually signaling that the brazing operation has been interrupted because of arcing at the brazing electrodes.

To reset the control circuit 100 after having been tripped in response to arcing, braze switch BS must be released, and reset switch RS, which may also be foot operated, is actuated. Its contacts RS1 close to direct actuating current to reset coil LRR of latching relay 104 which is thereupon returned to its normal condition with contacts LR1 closed and LR2 open. Since, in the disclosed embodiment, latching relay 104 is a low voltage DC version, diode D and resistor R1 insure reliable resetting operation. It will be noted that by installing ganged sets of brazing switch contacts and reset switch contacts in both the brazing contactor relay coil and latching relay reset coil energization circuits, the brazing and reset command functions are effectively interlocked. Thus, the control circuit cannot be "teased" by concurrent actuations of the braze switch BS and reset switch RS.

It will be appreciated that the functions of the disclosed relays can be readily implemented using solid state electronic components.

It will thus be seen that the objects set forth above and those made apparent from the preceding description are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. An anti-arcing control circuit for electrical brazing equipment, said control circuit comprising, in combination:

a pair of control circuit power lines for connection to an electrical power source;

a contactor relay having an operating coil connected across said power lines and normally open contacts operating in the power circuit for the brazing equipment to control the flow of brazing current to the electrodes thereof;

a normally open, manually operated brazing switch connected in series with said contactor relay coil across said power lines, closure of said brazing switch completing an energization circuit for said contactor relay coil to precipitate closure of said contactor relay contacts and the commencement of brazing current flow to the brazing equipment electrodes;

a pair of control leads connected across the brazing equipment electrodes;

arc voltage detecting means connected with said control leads and operating to interrupt said energization circuit for said contactor relay coil and thus open said contactor relay contacts in response to the existence of arcing at the brazing equipment electrodes, said arc voltage detecting means being a latching relay having a first operating coil connected with said control leads, a second operating coil connected across said power lines, and normally closed contacts connected in series with said contactor relay coil and said brazing switch across said power lines, whereby said first operating coil is activated by the presence of an arc voltage at the brazing equipment electrodes to effect a sustained opening of said latching relay contacts; and a manually operated, normally open reset switch connected in series with said latching relay second operating coil across said power lines, closure of said reset switch activating said second operating coil to effect a sustained closure of said latching relay contacts.

2. The anti-arcing control circuit defined in claim 1, wherein said latching relay further includes additional, normally open contacts, and said control circuit further includes signaling means connected in series with said additional latching relay contacts across said power lines, said latching relay additional contacts being closed up activation of said latching relay first operating coil to energize said signaling means.

3. An anti-arcing control circuit for electrical brazing equipment, said control circuit comprising, in combination:

a pair of control circuit power lines for connection to an electrical power source;

a contactor relay having an operating coil connected across said power lines and normally open contacts operating in the power circuit for the brazing equipment to control the flow of brazing current to the electrodes thereof;

a normally open, manually operated brazing switch connected in series with said contactor relay coil across said power lines, closure of said brazing switch completing an energization circuit for said contactor relay coil to precipitate closure of said contactor relay contacts and the commencement of brazing current flow to the brazing equipment electrodes;

a pair of control leads connected across the brazing equipment electrodes; and arc voltage detecting means connected with said control leads and operating to interrupt said energization circuit for said contactor relay coil and thus open said contactor relay contacts in response to the existence of arcing at the brazing equipment electrodes; and brazing voltage detecting means connected with said control leads and operating to inhibit said energization circuit for said contactor relay operating coil in response to a discontinuity in said control leads.

4. The anti-arcing control circuit defined in claim 3, wherein said arc voltage detecting means is a latching relay having a first operating coil connected with said control leads, a second operating coil connected across said power lines, and normally closed contacts connected in series with said contactor relay coil and said brazing switch across said power lines, whereby said first operating coil is activated by the presence of an arc voltage at the brazing equipment electrodes to effect a sustained opening of said latching relay contacts, said control circuit further including a manually operated, normally open reset switch connected in series with said latching relay second operating coil across said power lines, closure of said reset switch activates said second operating coil to effect a sustained closure of said latching relay contacts.

5. The anti-arcing control circuit defined in claim 4, wherein said brazing voltage detecting means includes an alarm relay having an operating coil connected across said control leads and normally closed contacts, and a time delay relay having an operating coil connected in series with said alarm relay contacts and said brazing switch across said power lines and normally closed contacts connected in series with said contactor relay operating coil, whereby failure of said alarm relay coil to be activated by the brazing voltage appearing across the brazing equipment electrodes enables said time delay relay coil to be activated through said alarm relay contacts, and said time delay relay contacts open after a predetermined time delay to interrupt said energization circuit for said contactor relay coil.

6. The control circuit defined in claim 5, wherein said time delay relay has additional normally open contacts connected in series with said operating coil thereof across said power lines to provide a holding energization circuit for said time delay relay coil upon activation thereof through said alarm relay contacts, said control circuit further including a normally closed, manually operated time delay relay dropout switch in said holding energization circuit.

7. The control circuit defined in claim 6, which further includes a signaling device connected in series with said additional time delay relay contacts across said power lines, said signaling device being electrically activated upon closure of said additional time delay relay contacts to signal the existence of a discontinuity in said control leads.

8. The control circuit defined in claim 7, wherein said latching relay further includes additional, normally open contacts, and said control circuit further includes signaling means connected in series with said additional latching relay contacts across said power lines, said latching relay additional contacts being closed up activation of said latching relay first operating coil to energize said signaling means.

9. The control circuit defined in claim 8, wherein said brazing switch includes normally closed contacts connected in series with said latching relays second operating coil and said reset switch includes normally closed contacts connected in series with said contactor relay operating coil.

* * * * *